United States Patent [19]

Kinoshita et al.

[11] Patent Number: 4,622,450

[45] Date of Patent: Nov. 11, 1986

[54] METHOD OF MEASURING FLEXURE VALUE OF WIRE ELECTRODE

[75] Inventors: Mitsuo Kinoshita, Hachioji; Haruki Obara, Sagamihara, both of Japan

[73] Assignee: Fanuc Ltd., Minamitsuru, Japan

[21] Appl. No.: 696,487

[22] Filed: Jan. 30, 1985

Related U.S. Application Data

[63] Continuation of Ser. No. 413,375, Aug. 25, 1982, Pat. No. 4,521,662.

[30] Foreign Application Priority Data

Dec. 29, 1980 [JP] Japan ................................ 55-185432

[51] Int. Cl.⁴ ................................................ B23P 1/08
[52] U.S. Cl. ................................ 219/69 W; 219/69 M
[58] Field of Search ............... 219/69 M, 69 W, 69 P, 219/69 R

[56] References Cited

U.S. PATENT DOCUMENTS 4,232,208 11/1980 Buhler ............................... 219/69 M
4,324,970 4/1982 Nanasawa ......................... 219/69 W

*Primary Examiner*—M. H. Paschall
*Attorney, Agent, or Firm*—Staas & Halsey

[57] ABSTRACT

A method of automatically measuring the flexure value of a wire electrode 1 in a wire-cut electric discharge machine is disclosed.

At a measurement point in the course of electric discharge machining, the electric discharge is temporarily stopped, and whether or not the wire electrode 1 and a workpiece 2 come into contact is sensed by a contact sensing device 107a. The wire electrode 1 and the workpiece 2 are moved relatively to advance or retreat in accordance with the sensed touch signal TS, and the distance $\epsilon_1$ of movement until the contact state changes, is measured. The flexure value $\epsilon$ is obtained calculatively from the measured movement distance $\epsilon_1$.

7 Claims, 7 Drawing Figures

METHOD OF MEASURING FLEXURE VALUE OF WIRE ELECTRODE

This is a continuation of co-pending application Ser. No. 413,375 filed on Aug. 25, 1982 now U.S. Pat. No. 4,521,662.

TECHNICAL FIELD

The present invention relates to a method of automatically measuring the value of flexure of a wire electrode due to electric discharge during electric discharge machining in a wire-cut electric discharge machine. More particularly, it relates to a method of automatically measuring the value of flexure of a wire electrode by utilizing the constituents of a wire-cut electric discharge machine.

BACKGROUND ART

The operating principle of a wire-cut electric discharge machine is that a predetermined gap is maintained between a wire electrode and a workpiece, while a voltage is applied therebetween to cause the spark discharge across the gap, whereby the workpiece is cut by the discharge energy. Accordingly, when the workpiece is moved relative to the wire on the basis of machining command data, it can be machined into a desired shape. In such a wire-cut electric discharge machine, when the wire electrode 1 advances in a groove 3 in the workpiece 2 in a predetermined direction while cutting the workpiece 2 by virtue of the electric discharge, as shown in an operation explaining diagram of FIG. 1, a pressure attributed to the electric discharge develops between the wire electrode 1 and the workpiece 2 as illustrated in a sectional view of FIG. 2, with the result that the wire electrode 1 is pushed back in the direction of an arrow, namely, in the direction opposite to the advancing direction. Therefore, the wire electrode 1 lies behind the position of wire guides 4, 4. That is, the wire electrode 1 flexes. When performing the electric discharge machining of a straight groove, the flexure does not affect the machining accuracy and is not a serious problem.

In a machining operation for forming a corner part, however, the flexure becomes an important problem. In order to form a groove 3 which consists of a first straight groove $L_1$ and a second straight groove $L_2$ orthogonal to the former, as shown in a front view of the machined groove in FIG. 3, a corner part CN needs to be formed at the intersection point of the first and second straight grooves $L_1$ and $L_2$ by machining. In forming the corner part CN, after the first straight groove $L_1$ has been formed by the unidirectional relative movement between the workpiece 2 and the wire electrode 1, this relative movement is changed into the orthogonal direction by a machining command. On account of the foregoing flexure of the wire electrode 1 ascribable to the electric discharge, however, the wire electrode 1 of the discharging part is dragged inwardly of the corner part CN, and unlike the commanded shape (indicated by a solid line), the machining path of the groove 3 deviates on the inner side considerably as indicated by dotted lines, so that the machined shape becomes blunt.

Likewise, when the corner part CN' between the first straight groove $L_1$ and the second straight groove $L_2$ is to be machined in the shape of a circular arc as shown in a front view of the machined groove in FIG. 4, the machining path of the corner part CN' becomes a blunt machined shape, indicated by the dotted lines, in contrast to the commanded shape of a solid line, because of the flexure of the wire electrode 1 ascribable to the electric discharge. This necessitates such a countermeasure in which the flexure value of the wire electrode is measured in advance, and in case of machining the corner, the workpiece is moved to a somewhat greater extent in correspondence with the flexure value.

SUMMARY OF THE INVENTION

It is accordingly an object of the present invention to provide a method of measuring the flexure value of a wire electrode which can automatically measure the flexure value of the wire electrode.

Another object of the present invention is to provide a method of measuring the flexure value of a wire electrode which can measure the flexure value of the wire electrode by utilizing the construction of a wire-cut electric discharge machine.

Further, another object of the present invention is to provide a method of measuring the flexure value of a wire electrode which permits machining to be restarted after the measurement of the flexure value of the wire electrode.

The present invention comprises a detection step of temporarily stopping electric discharge at a predetermined measurement point during electric discharge machining and then detecting the contact between a workpiece and a wire electrode at that time by detection means; a distance measuring step of advancing or retracting the wire electrode relative to the workpiece, depending upon whether or not the wire electrode lies in contact with the workpiece, thereby to measure a distance up to the place where the wire electrode and the workpiece comes into or out of contact; and a calculation step of calculating the flexure value of the wire electrode in accordance with the measured distance.

According to the present invention, therefore, not only the flexure value of the wire electrode can be automatically measured, but also such measurement can be executed by utilizing the existing construction of a wire-cut electric discharge machine, and the machining can be readily restarted after the measurement.

BRIEF DESCRIPTION OF THE PREFERRED EMBODIMENT

An embodiment of the present invention will now be described in detail with reference to the drawings.

Figure 1:
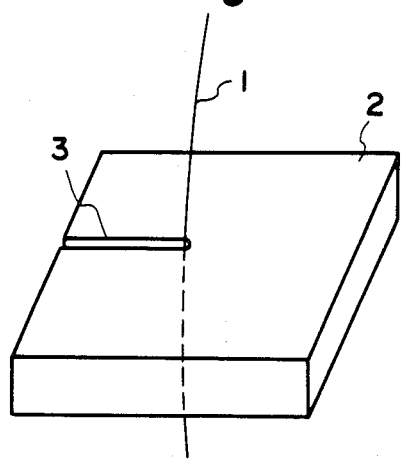
FIG. 1 illustrates the principle of the wire-cut electric discharge machining to which the present invention is applied.
Figure 2:
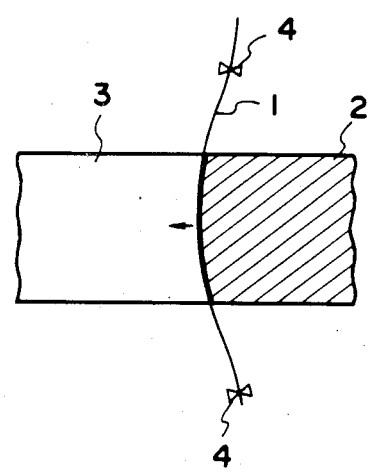
FIG. 2 is a sectional view of the workpiece illustrating the flexure of a wire electrode to which the present invention is directed.
Figure 3:
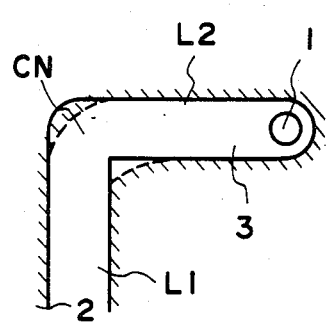
FIGS. 3 and 4 both illustrate machining errors attributed to the flexure.
Figure 4:
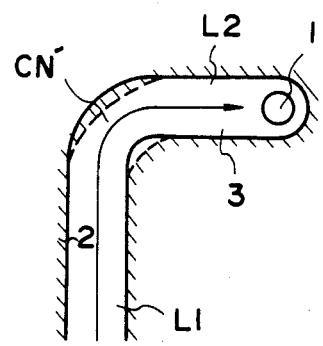
Figure 5:
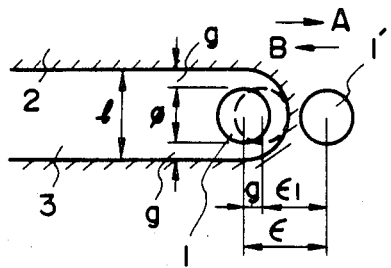
FIG. 5 illustrates a method of measuring a flexure value according to the present invention.

FIG. 5 illustrates a method of measuring a flexure value according to the present invention.

In the figure, symbols 1 and 1' both denote the sections of a wire electrode. The circle indicated at 1 is a wire electrode position at the maximum flexure value, while the circle indicated at 1' is a wire electrode position at a guide position. Numeral 2 designates a workpiece, and numeral 3 a groove formed by the electric discharge machining.

In the present invention, the measurement of a flexure value is performed in the following sequence:

(a) In the course of machining, the electric discharge is stopped temporarily at a predetermined measurement point (FIG. 5). Since the cessation of the electric discharge results in nullifying the pressure of the electric discharge, the wire electrode 1 having flexed is drawn toward guides (in a direction A in the figure) to come into contact with the workpiece 2.

When the wire electrode 1 has come into contact with the workpiece 2, a contact sensing device to be described later senses this contact.

(b) From the state in which the wire electrode 1 lies in contact with the workpiece 2, the wire electrode 1 is retracted relative to the workpiece 2 along the machining path. In retraction control, a table on which the workpiece 2 is placed may be moved relative to the wire 1 in the direction of the arrow A, or the guides may be retracted relative to the workpiece in the direction of an arrow B in a wire-cut electric discharge machine of the construction in which the guides can be moved.

(c) As the retraction control is continued, the contact between the wire electrode and the workpiece is released. The retraction distance $\epsilon_1$ from the discharge stopping position to the position where the contact between the wire electrode and the workpiece is released is measured in the aforementioned retraction control, and is stored in a memory built in an NC (numerical control device).

(d) When a true flexure value $\epsilon$ is subsequently calculated by the NC in accordance with the following equation, the measurement of the flexure value ends:

$$\epsilon = g + \epsilon_1 \quad (1)$$

Here, g denotes the gap of the electric discharge, and it is obtained from the following equation when the width of the machined groove is indicated by l and the diameter of the wire by $\phi$ as shown in FIG. 5:

$$g = (l - \phi)/2 \quad (2)$$

Accordingly, when the machined groove width l and the wire diameter $\phi$ are measured and entered into the NC in advance, the flexure value $\epsilon$ is found by executing the calculations of Equations (1) and (2). While, to the end of evaluating the discharging gap g, l and $\phi$ may be previously measured and entered in this manner, the discharging gap g may be actually measured by carrying out processing to be described below. When the contact between the wire electrode 1 and the workpiece 2 has been released by the foregoing retraction control, the wire electrode is moved in the direction orthogonal to the machining direction (machining path), so as to measure the distance to a position where the wire electrode and the workpiece come into contact again. Using this distance as the discharging gap g, the flexure value $\epsilon$ is obtained from Equation (1).

Under some machining conditions, the wire electrode 1 and the workpiece 2 do not come into contact when the electric discharge has been stopped at the measurement point. This is because the aforementioned discharging gap g between the wire electrode 1 and the workpiece 2 is greater than the flexure value of the wire electrode 1. In such a case, in other words, in a case where the contact sensing device does not sense the contact between the wire electrode and the workpiece after the stop of the electric discharge, (b') the wire electrode 1 is advanced in the machining direction until it comes into contact with the workpiece 2, (c') the advance distance $\epsilon'_1$ is measured, and (d') the calculation of:

$$\epsilon = g - \epsilon'_1 \quad (3)$$

is executed, whereby the flexure value $\epsilon$ is obtained.

The above is the outline of the method of measuring the flexure value according to the present invention. Further, the present invention is so improved as to permit the measurement of the flexure value with high precision. More specifically, when there are machining scraps in the machined groove 3, some measurement error may occur in the foregoing method. In the actual measurement of the flexure value, therefore, processing steps to be described below are added. In this way, the measurement of the flexure value with higher precision is permitted. That is, (e) when the wire electrode 1 has reached the measurement point, or when the flexure value measurement command has been generated, the wire electrode 1 is retracted to a predetermined position relative to the workpiece, whereupon (f) while performing the electric discharge (re-machining the workpiece), the wire electrode is advanced quickly to the measurement point again and then positioned at the measurement point, and after the electric discharge has been stopped, the flexure value measurement processing is executed by the foregoing steps (a) to (d). Due to the re-discharging (re-machining) processing, the machining scraps are blown away, so that a flexure value measurement of high accuracy is realized. Moreover, since the workpiece is re-machined at high speed, it is not excessively cut, and the flexure value does not change. Ordinarily, the re-machining speed needs to be at least 10 times higher than the normal machining speed in order to prevent the flexure value from changing. Besides, the retraction before the re-machining stage may be done at high speed while the electric discharge is being performed, or it may be done until the short-circuit is released, without performing the electric discharge. Further, the machining conditions should be relaxed during the re-discharging stage, if possible. In addition, although the re-machining stage is allowed to be repeated, too many re-machining stages results in cutting the workpiece excessively and creating a measurement error.

The measurement processing described above is carried out by entering an auxiliary command such as machining program "M20" before machining the workpiece and storing a measurement processing program in a memory for a control program, built in the NC, beforehand. That is, when the "M20" instruction has been read out, the measurement processing program starts to execute the flexure value measurement processing.

Figure 6:
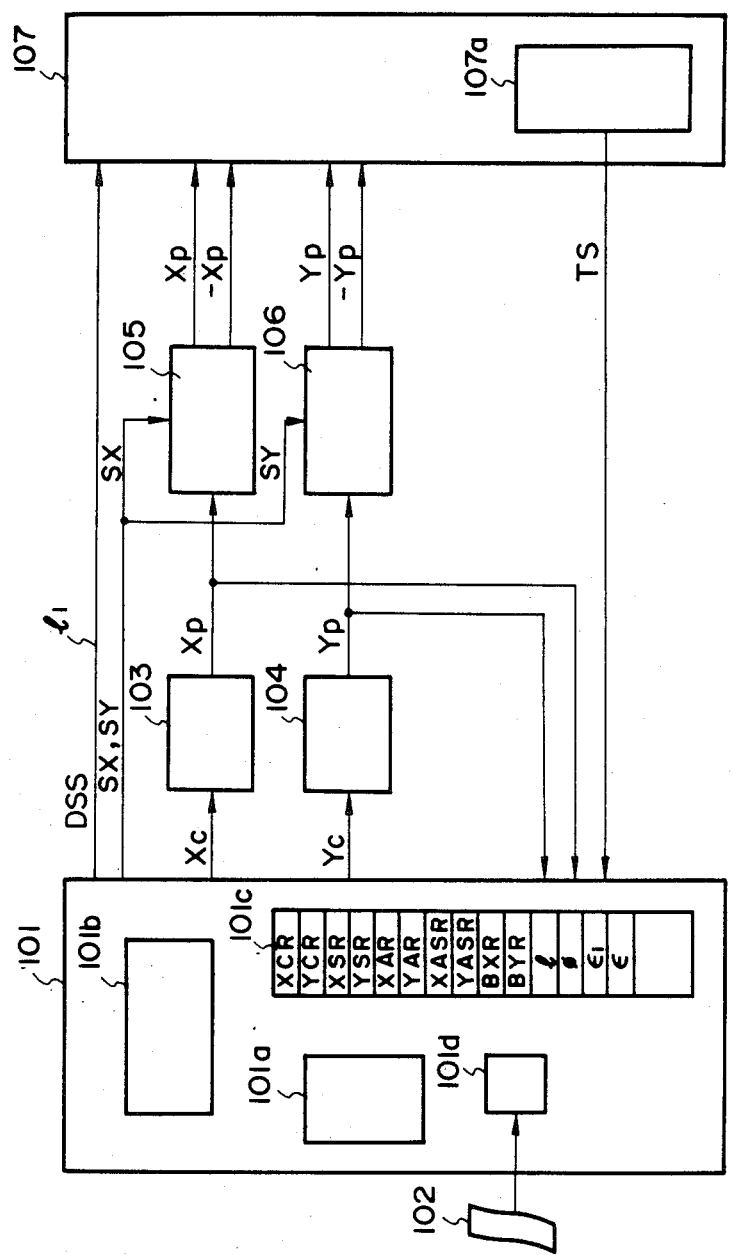
FIG. 6 is a block diagram of an embodiment of the present invention.

FIG. 6 is a block diagram of an embodiment for realizing the method of measuring the flexure value according to the present invention.

Referring to the figure, numeral 101 designates an NC (numerical control device) constructed of a microcomputer. It includes a memory 101a which stores the processing program for measuring the flexure value and the control program for executing the other numerical control processing, a processing unit 101b which executes predetermined processing on the basis of commands from the control program and a machining program to be described below, a data memory 101c which stores data and other calculated results, a tape reader 101d, etc. Numeral 102 designates a machining program tape storing machining data such as electric discharge machining paths and machining speeds. The auxiliary function instructions "M20" for the flexure value measurement are entered in suitable places of the machining program. Numerals 103 and 104 indicate pulse distributors which execute predetermined pulse distribution calculations on the basis of movement value commands $X_c$ and $Y_c$ issued from the NC, so as to provide distributed pulses $X_p$ and $Y_p$, respectively. Numerals 105 and 106 indicate moving direction controllers, which change the signs of the distributed pulses and then provide the resulting pulses in the retraction control. Shown at numeral 107 is a wire-cut electric discharge machine which comprises a wire electrode; a wire guide mechanism for supporting the wire electrode; a table for placing a workpiece thereon; a pair of X-axial and Y-axial motors for moving the table in the directions of X- and Y-axes respectively; a pair of servo circuits for driving the X- and Y-axial motors in accordance with the given distributed pulses $X_p$ and $Y_p$ respectively; and an electric discharge circuit for causing an electric discharge by applying a voltage between the wire electrode and the workpiece. The wire-cut electric discharge machine 107 will not be described in greater detail because it has the well-known construction wherein the table is moved by the motors in accordance with the distributed pulses $X_p$ and $Y_p$ and an instruction DSS from the NS, thereby subjecting the workpiece on the table to an electric discharge machining operation to cut it into a desired shape by means of the wire electrode. Further, this wire-cut electric discharge machine 107 is provided with a contact sensing device 107a which detects the contact between the wire and the workpiece.

Figure 7:
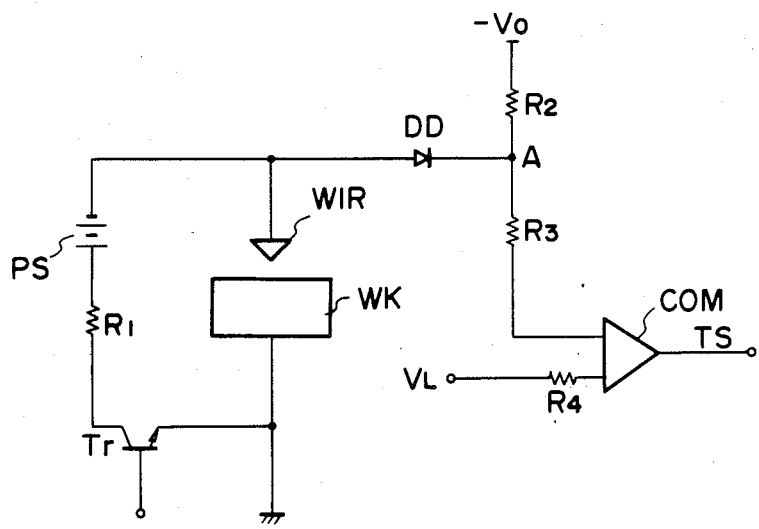
FIG. 7 is a circuit diagram of a contact sensing device used in the embodiment of FIG. 6.

FIG. 7 is a circuit diagram of the contact sensing device 107a, in which WIR denotes a wire electrode, WK a workpiece, PS a machining power supply, COM a comparator, $R_1$–$R_4$ resistors Tr a transistor for applying the machining voltage between the wire and the workpiece, DD a diode, and $V_L$ a detection level. Now, when the wire electrode WIR and the workpiece WK are not short-circuited, a voltage $-V_o$ is applied to the comparator COM, and hence, the comparator COM is not enabled. In contrast, when they are short-circuited, the potential at point A becomes zero volt, and the comparator COM is enabled to provide a contact signal TS. Thus, the short-circuit is detected.

The transistor Tr, the resistor $R_1$ and the machining power supply PS constitute the electric discharge circuit, while the diode DD, the resistors $R_2$, $R_3$ and $R_4$ and the comparator COM constitute the contact sensing device.

Next, operations in FIG. 6 will be briefly explained. It is supposed that, when the electric discharge is stopped at the measurement point, the wire electrode comes into contact with the workpiece.

Ordinarily, the NC executes numerical control processing on the basis of machining data read out from the machining program tape 102. More specifically, when position control data are read out from the machining program tape 102, the processing unit 101b stores the position command data $X_c$, $Y_c$ and signs SX, SY in position command registers XCR, YCR and sign registers XSR, YSR, and deliver them to the pulse distributors 103, 104 and the moving direction controllers 105, 106, respectively. In the position command registers and the sign registers, the latest position command data and signs are stored. Upon receiving the data $X_c$, $Y_c$, the pulse distributors 103, 104 execute the pulse distribution calculations on the basis of these data $X_c$, $Y_c$ and provide the distributed pulses $X_p$, $Y_p$. These distributed pulses $X_p$, $Y_p$ are respectively supplied through the moving direction controllers 105, 106 to the aforementioned X-axial and Y-axial servo circuits, not shown, within the wire-cut electric discharge machine 107 and thus drive the motors so as to move the table as programmed. Further, the distributed pulses $X_p$, $Y_p$ are entered into the NC and are counted by the processing unit 101b in accordance with the moving directions thereof, with respect to the contents of actual position registers XAR, YAR within the data memory 101c, whereupon the count values are set in the actual position registers XAR, YAR. That is, the actual position of the table is stored in the actual position registers XAR, YAR. When the table carrying the workpiece thereon has been moved by the above control, the spark discharge occurs between the wire electrode and the workpiece, and the workpiece is machined by the electric discharge machining as commanded. Under this state, (1) when the auxiliary function instruction "M20" for the measurement of a flexure value has been read out from the machining program tape 102, the processing unit 101b of the NC delivers the discharge stop command DSS to the electric discharge machine 107 through a line $l_1$, to turn "off" the transistor Tr (FIG. 7) and to stop the electric discharge. (2) Thereafter, the processing unit 101b reads out the latest position command data $X_c$, $Y_c$ and signs SX, SY stored in the position command registers XCR, YCR and sign registers XSR, YSR, and it applies the position command data $X_c$, $Y_c$ to the pulse distributors 103, 104, while it inverts the signs SX, SY and applies the resulting signs to the moving direction controllers 105, 106. In parallel with this, the processing unit 101b saves the contents of the actual position registers XAR, YAR (the positional coordinates of the measurement point) in X-axial and Y-axial saving registers XASR, YASR. On the basis of the position command data $X_c$, $Y_c$, the pulse distributors 103, 104 perform the pulse distributions to provide the distributed pulses $X_p$, $Y_p$. These distributed pulses $X_p$, $Y_p$ are converted into pulses, in the directions opposite those generated during the machining operation, by the moving direction controllers 105, 106 and in accordance with the instructions of the signs SX, SY. The converted pulses are then applied to the servo circuits. As a result, the table retreats in a direction opposite the machining direction until the wire electrode does not contact the workpiece. The distributed pulses $X_p$, $Y_p$ are applied to the NC, and they are counted in accordance with the moving directions and then stored in the actual position registers XAR, YAR by the processing unit 101b. (3) When the wire electrode has come away from the workpiece, this state is sensed (TS="0") and reported to the NC 101 by the contact sensing device 107a, and the NC gives an instruction to stop the retraction of the table. (4) Subsequently, the processing unit 101b of the NC causes the electric discharge machine 107 to start the electric discharge, through the line $l_1$. It also applies the signs SX, SY to the moving direction controllers 105, 106 and causes the pulse distributors to execute the pulse distribution calculations again so as to apply the distributed pulses $X_p$, $Y_p$ to the servo circuits through the moving direction controllers 105, 106, thereby to advance the table at high speed. (5) When the processing unit 101b has sensed the agreement between the contents of the actual position registers XAR, YAR and the saving registers XASR, YASR, it stops the electric discharge again and stops the advance of the table.

(6) If, at this time, the wire electrode lies in contact with the workpiece, the touch signal TS is provided from the contact sensing device 107a. In response to the touch signal TS (="1"), the NC retracts the wire relative to the workpiece by controls similar to the foregoing steps (2) and (3) until they come out of contact (TS="0"). The pulses $X_p$, $X_p$ generated at this time are counted, and their total numbers $X_n$, $Y_n$ are stored in flexure value registers BXR, BYR. (7) When the contact has been released (TS="0"), the processing unit 101b of the NC evaluates the retraction distance $\epsilon_1$ by calculating:

$$\epsilon_1 = k\sqrt{X_n^2 + Y_n^2}$$

(where k is a constant) (8) Subsequently, using the machined groove width l and the wire diameter $\phi$ stored in the data memory 101c, the flexure value $\epsilon$ is calculated and obtained from Equations (1) and (2). (9) Thenceforth, the wire electrode is advanced relative to the workpiece up to the measurement point as in the steps (4) and (5). Then, the flexure value measurement processing ends. While, in the above description, it is assumed that the wire comes into contact with the workpiece when the electric discharge is stopped at the measurement point, even a case where they do not come into contact can be processed substantially in the same way.

More specifically, when the wire and workpiece do not contact the foregoing steps (1)–(5) are executed. When, in the step (3), the contact signal is read by the contact sensing device 107a immediately after the retracting movement, the signal TS is "0" because originally the wire and the workpiece are out of contact, and hence, the movement of the table is immediately stopped. Thereafter, conversely to the foregoing step (6), the wire is advanced relative to the workpiece until they come into contact (TS="0"). The pulses $X_p$, $Y_p$ developed at this time are counted, and the total counts $X_n$, $Y_n$ are stored in the flexure value registers BXR, BYR. The foregoing step (7) is executed to obtain $\epsilon_1'$, and further, the flexure value $\epsilon$ is obtained from Equations (2) and (3). Lastly, the wire electrode is retracted relative to the workpiece up to the measurement point. Then, the measurement processing ends.

Alternatively, in the flow of the foregoing steps, the step of detecting from the signal of the contact sensing device 107a whether or not the wire electrode lies in contact with the workpiece may be provided between the steps (1) and (2). This measure affords a sufficient retraction distance in the step (2) in the case where the workpiece and the wire electrode are out of contact at the stop of the electric discharge. In addition, while the pulse distributors and the moving direction controllers have been explained as being disposed outside the NC, they may be disposed in the NC. Further, different methods of retraction control may be contrived.

As set forth above, according to the present invention, the flexure value of a wire electrode can be automatically measured, and after the measurement, machining can be restarted immediately and high precision wire-cut electric discharge machining is achieved. Therefore, the invention can enhance machining precision when applied to a wire-cut electric discharge machine.

What is claimed is:

1. A method of measuring a value of flexure of a wire electrode, the flexure being caused by an electric discharge across a discharge gap, the method comprising the steps of:
    (a) detecting by ohmic contact detection means whether or not the wire electrode comes into contact with the workpiece when electric discharge is temporarily stopped at a predetermined measurement point during the course of electric discharge machining along a first direction in a machining groove;
    (b) retracting said wire electrode relative to said workpiece in a second direction opposite said first direction along said machining groove until the wire electrode comes out of ohmic contact with the workpiece in the case where they lie in contact, a distance of the retraction being measured, or advancing said wire electrode relative to said workpiece in said first direction until the wire electrode comes into ohmic contact with the workpiece in the case where they do not lie in ohmic contact, a distance of the advance being measured; and
    (c) calculating the flexure value in accordance with the size of the discharge gap, and the retraction distance or the advance distance.

2. A method of measuring a flexure value of a wire electrode as defined by claim 1, wherein in step (c), said flexure value is calculated in accordance with the following where g denotes the size of the discharge gap and $\epsilon_1$ denotes said retraction distance:

$$\epsilon = g + \epsilon_1$$

(where $\epsilon$ indicates said flexure value).

3. A method of measuring a flexure value of a wire electrode as defined in claim 1, wherein in step (c), said flexure value is calculated in accordance with the following where g denotes the size of the discharge gap and $\epsilon_1'$ denotes said advance distance:

$$\epsilon = g - \epsilon_1'$$

(where $\epsilon$ indicates said flexure value).

4. A method of measuring a flexure value of a wire electrode as defined in claim 1, wherein said method further comprises the step of:
    prior to step (a), retracting said wire electrode from said measurement point and thereafter returning the wire electrode to the workpiece while the electric discharge is being performed.

5. A method of measuring a flexure value of a wire electrode as defined in claim 1, wherein said method further comprises the step of: after step (b) moving said wire electrode back to said measurement point.

6. A method of measuring flexure of a wire electrode as defined by claim 1, wherein the discharge gap size is obtained by the following:

$$\epsilon g = (l - \phi)/2,$$

where L indicates the width of the machining groove, and $\phi$ indicates the diameter of the wire electrode.

7. A method of measuring flexure of a wire electrode as defined by claim 3, wherein the discharge gap size is obtained by the following:

$$\epsilon g = (l - \phi)/2,$$

where L indicates the width of the machining groove, and $\phi$ indicates the diameter of the wire electrode.

* * * * *

UNITED STATES PATENT AND TRADEMARK OFFICE
CERTIFICATE OF CORRECTION

PATENT NO.    : 4,622,450

DATED         : November 11, 1986

INVENTOR(S)   : Kinoshita et al.

It is certified that error appears in the above-identified patent and that said Letters Patent is hereby corrected as shown below:

Column 6, line 36 "$l_1$" should be -- $\ell_1$ --.

Column 7, line 1, "$l_1$" should be -- $\ell_1$ --;

line 30, "l" should be -- $\ell$ --.

Column 9, line 8, "L" should be --l--.

Column 10, line 7, "L" should be --l--.

Signed and Sealed this

Tenth Day of February, 1987

Attest:

DONALD J. QUIGG

Attesting Officer

Commissioner of Patents and Trademarks